(12) United States Patent
Miyata et al.

(10) Patent No.: US 7,136,739 B2
(45) Date of Patent: Nov. 14, 2006

(54) ENGINE CONTROL DEVICE

(75) Inventors: Toshiyuki Miyata, Okazaki (JP); Katsunori Ueda, Okazaki (JP); Kenichi Nakamori, Okazaki (JP); Koji Kawakita, Ohbu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/102,680

(22) Filed: Apr. 11, 2005

(65) Prior Publication Data

US 2005/0241376 A1 Nov. 3, 2005

(30) Foreign Application Priority Data

Apr. 12, 2004 (JP) .............................. 2004-116887

(51) Int. Cl.
*G01L 3/26* (2006.01)
*F02D 45/00* (2006.01)
(52) U.S. Cl. ..................... 701/104; 73/117.3; 701/110
(58) Field of Classification Search ................ 701/104, 701/110, 114, 102; 73/116, 117.3; 123/406.14, 123/406.24, 406.27
See application file for complete search history.

(56) References Cited

U.S. PATENT DOCUMENTS 5,197,325 A * 3/1993 Tamura et al. ............. 73/117.3
5,333,585 A * 8/1994 Kuroda ................... 123/339.11
5,639,960 A * 6/1997 Nakagawa ................... 701/110
6,530,360 B1* 3/2003 Kondo ........................ 701/110

FOREIGN PATENT DOCUMENTS

JP 2000-205035 A 7/2000

* cited by examiner

*Primary Examiner*—Hieu T. Vo
(74) *Attorney, Agent, or Firm*—Birch, Stewart, Kolasch & Birch, LLP

(57) ABSTRACT

An engine control device for detecting misfire of an engine. Based on a detected crank angle of the engine, an angular velocity at a first crank angle at which the engine speed is close to a minimum within one combustion cycle of each cylinder is calculated as a pre-combustion angular velocity, and an angular velocity at a second crank angle at which the engine speed is close to a maximum within the same combustion cycle is calculated as a post-combustion angular velocity. An amount of rotation variation caused between the first and second crank angles is calculated based on the pre-combustion and post-combustion angular velocities of the same combustion cycle, and is compared with a predetermined misfire criterion to determine whether or not misfire has occurred. When misfire is detected, a required operation is performed, for example, a warning lamp is turned on or the fuel supply quantity is increased.

10 Claims, 4 Drawing Sheets

ENGINE CONTROL DEVICE

CROSS-REFERENCE TO RELATED APPLICATIONS

This non-provisional application claims priority under 35 U.S.C. 119(a) on Patent Application No. 2004-116887 filed in Japan on Apr. 12, 2004, the entire contents of which are incorporated herein by reference.

BACKGROUND OF THE INVENTION

1. Field of the Invention

The present invention relates to an engine control device for detecting misfire of an engine and, on detection of misfire, performing counter-misfire control by, for example, issuing a warning or correcting the fuel injection quantity.

2. Description of the Related Art

Incomplete combustion of fuel in engine cylinders is an immediate cause of inconveniences such as deterioration in exhaust gas characteristics, and therefore, the regulations regarding OBD (On-Board Diagnosis) require that a motor vehicle be provided with the function of notifying the driver of the occurrence of misfire, which is a cause of incomplete combustion. The misfire detection is also utilized for various control purposes to avoid the combustion being deteriorated. In the circumstances, there has been a demand for a misfire detection device capable of accurate detection of misfire.

As conventional misfire detection devices, there has been known a device using a misfire detection method based on the period of crank angle (CA), for example. In this method, on the basis of the output from a crank angle sensor, an average angular acceleration is calculated with respect to every combustion cycle corresponding to 180° CA, and the calculated average angular acceleration is compared with a predetermined misfire criterion value to determine whether or not misfire has occurred. The period of the combustion cycle corresponding to 180° CA is, however, affected by external factors other than deterioration of combustion due to misfire, such as reactive movement of the engine during travel on a rough road or the input of load on the engine by an air conditioner etc., and such factors cause error of the average angular acceleration as a result. Accordingly, as measures against the error, the misfire detection is carried out based on three parameters, namely, the absolute value of average angular acceleration, and deviations of the absolute value from the average angular accelerations of preceding and succeeding combustion cycles.

Despite the measures, the conventional misfire detection device is still unable to provide satisfactory accuracy in misfire detection. For example, at the cold start of the engine, catalyst W/U (warming up) control is performed in which activation of the catalyst is accelerated by retarding the ignition timing and making the air-fuel mixture lean. In such an operating state, the engine speed varies greatly due to poor combustion, and also the average angular acceleration of each cycle is strongly influenced by the immediately preceding cycle. With the above misfire detection technique, therefore, it is difficult to discriminate between normal combustion and misfire, and thus accurate misfire detection cannot be expected.

Also, where the catalyst W/U control is performed on the engine using a heavy fuel, which is a fuel with very low volatility intended for use in high-temperature districts, the air-fuel ratio shifts toward the lean side as the amount of fuel adhering to the intake ports increases, deteriorating the combustion. To cope with such heavy fuel, therefore, during the catalyst W/U control, combustion control is carried out in which the fuel injection quantity and the ignition timing are corrected by using the average angular acceleration as an index of combustion, to thereby stabilize the combustion. However, if the calculated average angular acceleration itself contains error as mentioned above, then it is not possible to carry out appropriate correction matching the combustion deterioration level, causing inconveniences such as delay in activation of the catalyst or deterioration in exhaust gas characteristics.

In view of the foregoing, there has been proposed a misfire detection device which is adapted to detect misfire based on an amount of rotation variation during the combustion cycle of each cylinder, as disclosed in Unexamined Japanese Patent Publication No. 2000-205035, for example. In this misfire detection device, the amount of rotation variation during the combustion cycle of each cylinder is calculated based on the time period required for every 30° CA, and if the deviation of a currently calculated rotation variation amount from the rotation variation amount calculated three ignitions (360° CA) before is greater than a misfire criterion value, it is judged that misfire has occurred.

However, in the misfire detection device disclosed in FIGS. 3 and 4 of Unexamined Japanese Patent Publication No. 2000-205035, misfire of a current combustion cycle is determined with the use of the rotation variation amount of the combustion cycle which is three ignitions before the current cycle. Accordingly, the determination result not only reflects the current combustion but is influenced by the combustion three ignitions before.

Specifically, when the current combustion is slightly poor but not to such an extent that misfire is caused, it may possibly be judged that misfire has occurred, if the combustion three ignitions before was very satisfactory and thus the deviation between the rotation variation amounts is greater than the misfire criterion value. Conversely, even when the current combustion is so poor that misfire is caused, it may possibly be judged that no misfire has occurred, if the combustion three ignitions before was poor but not to such an extent that misfire is caused and thus the deviation between the rotation variation amounts is smaller than the misfire criterion value. Consequently, in such situations, the OBD fails to notify the driver of the occurrence of misfire. Also, where the combustion control, as measures to cope with heavy fuel, is performed during the catalyst W/U control, a problem arises in that the fuel injection quantity and the ignition timing fail to be appropriately corrected.

SUMMARY OF THE INVENTION

An object of the present invention is therefore to provide an engine control device capable of accurately detecting misfire of each combustion cycle to perform suitable counter-misfire control, without being influenced by the combustions of preceding combustion cycles.

To achieve the object, the present invention provides an engine control device for detecting misfire of an engine of a motor vehicle. The engine control device comprises: crank angle detection means for detecting a crank angle of the engine; angular velocity calculation means for calculating a pre-combustion angular velocity and a post-combustion angular velocity based on the crank angle detected by the crank angle detection means, the pre-combustion angular velocity being an angular velocity at a first crank angle at which rotation speed of the engine is close to a minimum value within one combustion cycle of each cylinder of the engine, the post-combustion angular velocity being an angular velocity at a second crank angle at which the rotation speed of the engine is close to a maximum value within the one combustion cycle; rotation variation amount calculation means for calculating, based on the pre-combustion and post-combustion angular velocities of the one combustion cycle, an amount of rotation variation caused between the first and second crank angles; misfire determination means for comparing the rotation variation amount calculated by the rotation variation amount calculation means with a predetermined misfire criterion value, to determine whether or not misfire has occurred in the one combustion cycle; and counter-misfire control means for performing a required operation when it is judged by the misfire determination means that misfire has occurred.

In the engine control device of the present invention, the amount of rotation variation caused during one combustion cycle of each cylinder is compared with the misfire criterion value to determine whether or not misfire has occurred. Accurate determination results can therefore be obtained without being influenced by the combustions of preceding combustion cycles.

When it is judged that misfire has occurred, the counter-misfire control means preferably warns the driver of the vehicle that misfire has occurred. Where the engine control device is provided with catalyst temperature raising means for retarding the ignition timing and making the air-fuel ratio lean at the start of the engine to raise the temperature of a catalyst arranged in an exhaust system of the engine, the counter-misfire control means may be adapted to correct the fuel injection quantity of the engine toward an incremental side when it is judged that misfire has occurred.

At the start of the engine provided with the catalyst temperature raising means, the ignition timing is retarded and the air-fuel ratio is made lean by the catalyst temperature raising means to raise the temperature of the catalyst. If, during this control, misfire is detected by the misfire determination means, the fuel injection quantity of the engine is corrected toward the incremental side by the counter-misfire control means, whereby the air-fuel ratio is controlled toward the rich side, thereby stabilizing the combustion.

The detection of misfire by the misfire determination means is carried out by comparing the amount of rotation variation caused during one combustion cycle with the misfire criterion value, and therefore, accurate determination results can be obtained without the influence of the combustions of preceding combustion cycles. Based on the accurate determination results, the fuel injection quantity is adequately corrected during the catalyst W/U control so that the air-fuel mixture may be as lean as possible without causing misfire, whereby activation of the catalyst can be satisfactorily accelerated while at the same time avoiding deterioration in combustion due to misfire. Also, even in a situation where misfire is liable to occur because of the use of a heavy fuel with low volatility, for example, the fuel injection quantity can be adequately corrected so that the air-fuel mixture may be as lean as possible without causing misfire.

Preferably, in the engine control device of the present invention, the counter-misfire control means corrects the fuel injection quantity of the engine toward the incremental side when it is judged by the misfire determination means that half-misfire has occurred, and suspends the incremental correction of the fuel injection quantity of the engine when it is judged by the misfire determination means that complete misfire has occurred.

Thus, when it is judged by the misfire determination means that half-misfire has occurred, the fuel injection quantity of the engine is corrected toward the incremental side, whereby the air-fuel ratio is controlled toward the rich side, thereby stabilizing the combustion. On the other hand, when it is judged by the misfire determination means that complete misfire has occurred, the incremental correction of the fuel injection quantity is suspended. Complete misfire occurring during the catalyst temperature elevation control is presumably caused due to lean air-fuel mixture, but in some cases, complete misfire is caused when the air-fuel ratio is varied toward the rich side for some reason. If, in such a situation, the fuel injection quantity is incremented, the fuel increment is emitted without being burned at all. The inconvenience can be avoided by suspending the incremental correction of the fuel injection quantity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirits and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

Figure 1:
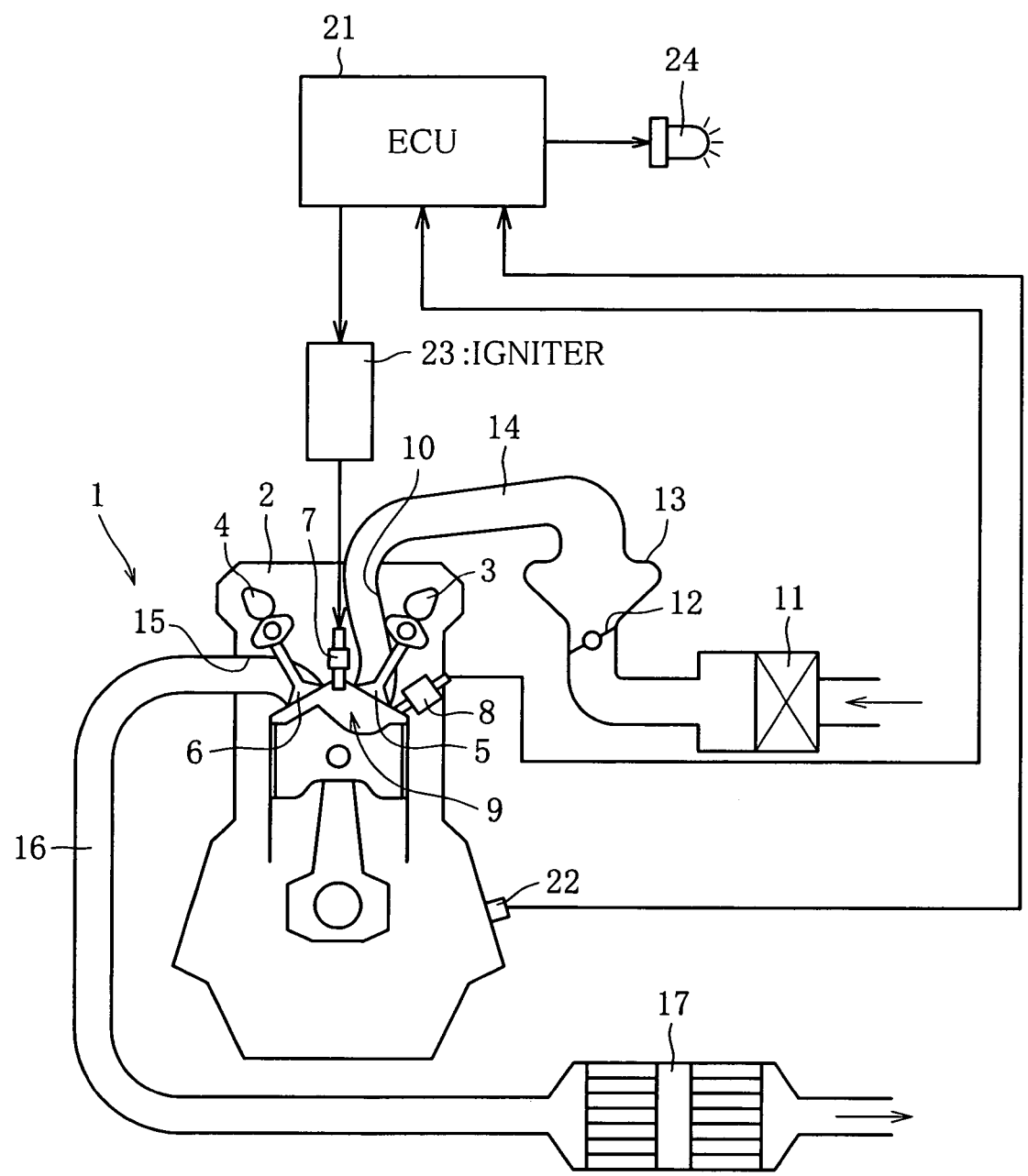
FIG. 1 is a block diagram showing an entire construction of a combustion control device for an engine according to an embodiment.

FIG. 1 shows an entire construction of a combustion control device for an engine, according to one embodiment of the present invention, and the combustion control device is adapted for a direct injection type in-line four-cylinder gasoline engine 1 of a motor vehicle. The engine 1 uses a DOHC four-valve type valve system. Thus, an intake camshaft 3 and an exhaust camshaft 4 are both provided at an upper portion of a cylinder head 2 and are rotated by a crankshaft, not shown, so that intake valves 5 and exhaust valves 6 are opened and closed at respective predetermined timings by the camshafts 3 and 4.

The cylinder head 2 is fitted, with respect to each cylinder, with an ignition plug 7 and a solenoid-operated fuel injection valve 8, and when the fuel injection valve 8 is opened, high-pressure fuel supplied from a fuel pump, not shown, is directly injected into a combustion chamber 9. Substantially upright intake ports 10 are formed in the cylinder head 2 and between the camshafts 3 and 4, and when the intake valves 5 are opened, intake air is introduced into the combustion chamber 9 from an air cleaner 11 through a throttle valve 12, a surge tank 13, an intake manifold 14 and the intake ports 10. When the exhaust valves 6 are opened, exhaust gas produced as a result of combustion is discharged from the combustion chamber 9 to exhaust ports 15 and then into the atmosphere through an exhaust passage 16 and a catalyst 17.

In the vehicle compartment is arranged an ECU (engine control unit, or engine control device) 21, which includes input/output devices, storage devices (ROM, RAM, etc.) storing control programs, control maps, etc., a central processing unit (CPU), timer/counters, etc., none of which are shown. The ECU 21 carries out integrated control of the engine 1. The input of the ECU 21 is connected with various sensors including a crank angle sensor 22 (crank angle detection means) for outputting an SGT signal at intervals of 10° CA of the engine 1. The output of the ECU 21 is connected with various devices such as an igniter 23 for energizing the ignition plug 7, the fuel injection valve 8, and a warning lamp 24 arranged near the driver's seat of the vehicle.

Based on detection information from the sensors, the ECU 21 determines ignition timing, fuel injection quantity, etc., and controls the operation of the igniter 23 and fuel injection valve 8 in accordance with the determined control quantities, to operate the engine 1.

Also, the ECU 21 monitors the combustion of the engine 1 and, in case of misfire, turns on the warning lamp 24 to notify the driver of the occurrence of misfire (counter-misfire control means) in compliance with the OBD regulations. At the start of the engine 1, the ECU 21 performs catalyst W/U control for retarding the ignition timing and making the air-fuel mixture lean to accelerate activation of the catalyst 17 (catalyst temperature raising means), as well as combustion F/B control in accordance with the misfire determination result, to avoid deterioration in combustion during the catalyst W/U control (counter-misfire control means). In the following, the misfire determination process, the catalyst W/U control and the combustion F/B control will be explained in detail.

Figure 2:
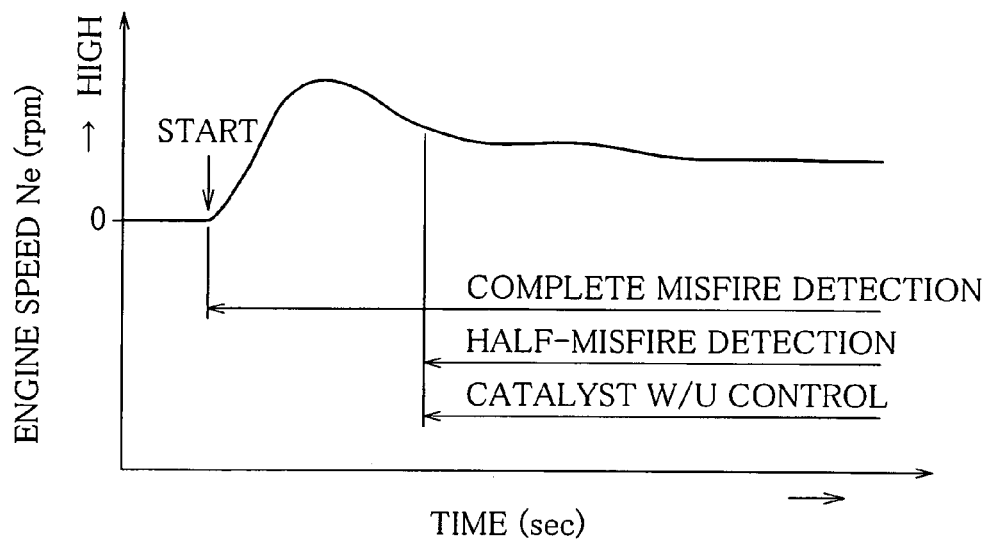
FIG. 2 is a timing chart illustrating how a misfire determination process and catalyst W/U control are executed at the start of the engine.

FIG. 2 is a timing chart illustrating how the misfire determination process and the catalyst W/U control are executed at the start of the engine. As illustrated, the misfire determination process is started when the engine is started, while the catalyst W/U control is started after a lapse of a predetermined period (e.g., 1 sec) during which the engine rotation can be stabilized following the start. In the misfire determination process, the combustion of the engine 1 is discriminated so as to fall under one of normal combustion, half-misfire and complete misfire, as described later. However, since it is difficult to accurately detect half-misfire while the engine rotation is unstable immediately after the start, only normal combustion and complete misfire are detected at the start of the engine, and the detection of half-misfire is started together with the catalyst W/U control.

The half-misfire detection may alternatively be started at desiring timing different from the timing for starting the catalyst W/U control. Also, in this embodiment, the combustion F/B control for avoiding deterioration in combustion is performed only during the catalyst W/U control, but may be continuously executed after the temperature of the catalyst 17 becomes sufficiently high and thus the catalyst W/U control is terminated.

The misfire determination process of the present invention is performed based on a normalized rotation deviation $\Delta Nexpn$ which is obtained as a rotation variation amount during one combustion cycle of each cylinder. In the following, the procedure for calculating the normalized rotation deviation $\Delta Nexpn$ will be described.

Figure 3:
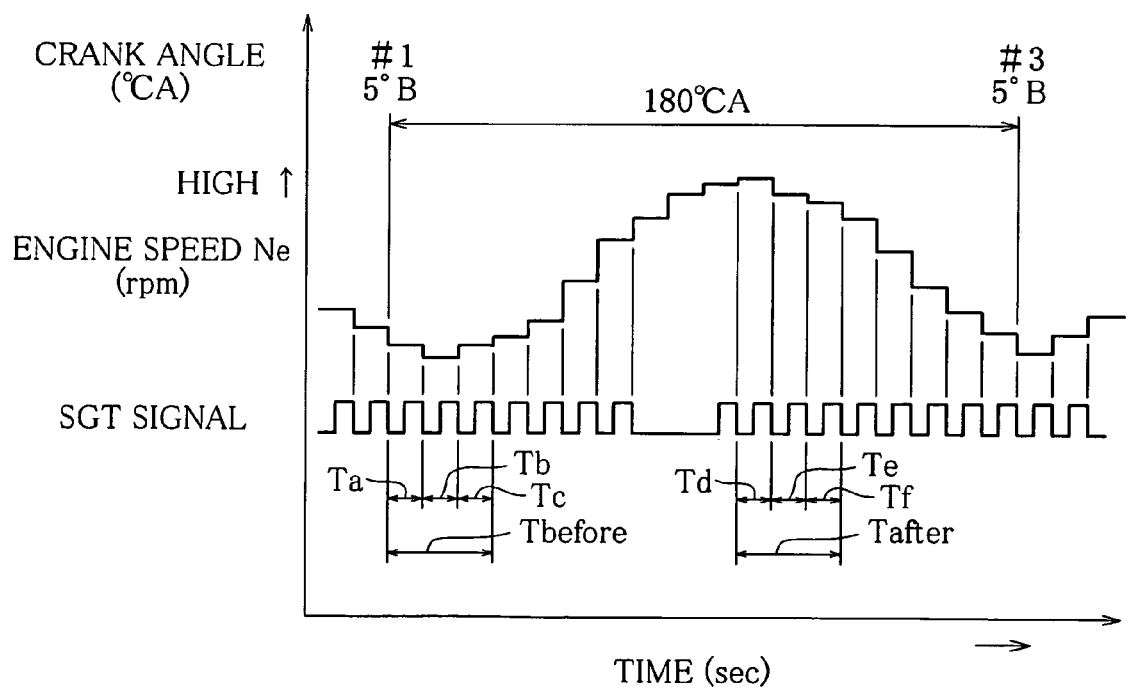
FIG. 3 is a timing chart illustrating how a normalized rotation deviation is calculated in relation to engine rotation variation.

FIG. 3 is a timing chart illustrating how the normalized rotation deviation $\Delta Nexpn$ is calculated in relation to rotation variation of the engine 1. The engine rotation speed Ne varies in a manner synchronized with the combustion cycles of the respective cylinders at intervals of 180° CA. Although the figure only shows how the engine speed Ne varies during one combustion cycle of the #1 cylinder, identical rotation variation is observed during the combustion cycles of the other cylinders.

In this embodiment, the engine has four cylinders. Accordingly, each cylinder undergoes the combustion cycle once as the crankshaft rotates for a crank angle of 720°, and during two complete rotations of the crankshaft, the combustion cycles of the four cylinders successively take place. Thus, as the crankshaft rotates, the misfire determination process is performed successively for the four cylinders in predetermined firing order at intervals of 180° CA. In the case of a two-cylinder four-cycle engine, the misfire determination process is intermittently performed with a pause of 180° CA, and in the case of a six-cylinder engine in which the combustion cycles of the cylinders overlap with one another, the misfire determination process is started at intervals of 120° CA for the overlapping combustion cycles. The results of misfire determination of the individual cylinders are reflected in the subsequent fuel injections etc.

Ignition for each cylinder is performed in the vicinity of the compression top dead center (0° CA), but a certain period of time is necessary for the combustion pressure in the cylinder to begin to rise. Thus, in the combustion cycle of the #1 cylinder shown in FIG. 3, the engine speed Ne decreases to a minimum slightly after BTDC 5° CA of the #1 cylinder and then increases to a maximum. Subsequently, the engine speed Ne again decreases to a minimum slightly after BTDC 5° CA of the #3 cylinder. Taking account of such rotation variation, a crank angle range of 30° CA following BTDC 5° CA, which includes the minimum of the engine speed Ne in the combustion cycle of each cylinder, is previously set as a pre-combustion detection time period Tbefore, and a crank angle range of 30° CA including the maximum of the engine speed Ne in the combustion cycle is previously set as a post-combustion detection time period Tafter.

The crank angle at which the engine speed Ne drops to the minimum is substantially fixed regardless of operating condition of the engine 1, but the crank angle at which the engine speed Ne reaches the maximum considerably varies depending on the ignition timing. Accordingly, the start time of the pre-combustion detection time period Tbefore is set to a fixed value determined in advance. On the other hand, the start time of the post-combustion detection time period Tafter should be set such that the start time is delayed with increase in the amount of retardation of the ignition timing set during the catalyst W/U control. In the above instance, the start time of the post-combustion detection time period Tafter is set so as to be in the vicinity of the maximum of the engine speed Ne.

The manner of setting the pre-combustion detection time period Tbefore and the post-combustion detection time period Tafter is not limited to the foregoing. For example, the start time of the post-combustion detection time period Tafter may be slightly retarded or advanced relative to the maximum of the engine speed Ne, and also the pre-combustion detection time period Tbefore may be shifted in accordance with the retardation of the ignition timing.

The ECU 21 determines the crank angle on the basis of the SGT signal input thereto from the crank angle sensor 22 at intervals of 10° CA. When the crank angle reaches an angle corresponding to the pre-combustion detection time period Tbefore in the combustion cycle of each cylinder, the ECU starts to successively calculate durations of periods Ta, Tb and Tc in the pre-combustion detection time period Tbefore, each corresponding to 10° CA, and stores the calculated periods. Similarly, when the crank angle thereafter reaches an angle corresponding to the post-combustion detection time period Tafter, the ECU starts to successively calculate durations of periods Td, Te and Tf in the post-combustion detection time period Tafter, each corresponding to 10° CA, and stores the calculated periods.

Then, each time BTDC 5° CA of each combustion cycle is reached, the ECU 21 calculates a normalized rotation deviation ΔNexpn on the basis of the periods Ta to Tf of the corresponding combustion cycle, following the procedure described below.

First, a pre-combustion average period τL, which is an average period in the pre-combustion detection time period Tbefore, is calculated according to the following equation (1):

$$\tau L = \left(\frac{Ta+Tb}{2} + \frac{Tb+Tc}{2}\right)/2 = \frac{Ta+2Tb+Tc}{4} \quad (1)$$

The pre-combustion average period τL could be calculated in a different way by, for example, simply averaging periods over 30° CA, based on the two edges of the output of the crank angle sensor corresponding to the start and end of the pre-combustion detection time period Tbefore (the leading edge of the period Ta and the trailing edge of the period Tc). In this case, however, significant machining error, if contained in either of the edges as a result of processing, adversely affects the calculated pre-combustion average period τL. According to the present invention, the above equation (1) is used to derive, as the pre-combustion average period τL, a weighted average of a total of the three periods Ta, Tb and Tc corresponding to 30° CA. Thus, even if any of the edges of the periods Ta, Tb and Tc contains significant machining error as a result of processing, the influence of such error is lessened, making it possible to calculate the pre-combustion average period τL (unit: msec) with higher accuracy.

Similarly, a post-combustion average period τH (unit: msec), which is an average period in the post-combustion detection time period Tafter, is calculated according to the equation (2) below. Also in this case, the post-combustion average period τH is calculated by deriving a weighted average of the periods Td, Te and Tf, thereby lessening the influence of machining error in the edges.

$$\tau H = \left(\frac{Td+Te}{2} + \frac{Te+Tf}{2}\right)/2 = \frac{Td+2Te+Tf}{4} \quad (2)$$

Subsequently, the pre-combustion average period τL and the post-combustion average period τH, calculated in the aforementioned manner, are respectively converted into a pre-combustion angular velocity NexpL (unit: rpm) and a post-combustion angular velocity NexpH (unit: rpm) according to the following equations (3) and (4) (angular velocity calculation means):

$$NexpL = 30{,}000/(\tau L \times 18) \quad (3)$$

$$NexpH = 30{,}000/(\tau H \times 18) \quad (4)$$

Further, based on the obtained pre-combustion angular velocity NexpL and post-combustion angular velocity NexpH, a rotation deviation ΔNexp (rotation variation amount; unit: rpm) between the pre-combustion detection time period Tbefore and the post-combustion detection time period Tafter is calculated according to the following equation (5) (rotation variation amount calculation means):

$$\Delta Nexp = NexpH - NexpL \quad (55)$$

The obtained rotation deviation ΔNexp is then normalized to derive a normalized rotation deviation ΔNexpn (unit: rpm), which is a 1000 rpm-equivalent value, according to the following equation (6):

$$\Delta Nexpn = \Delta Nexp \times Ne/1000 \quad (6)$$

Figure 4:
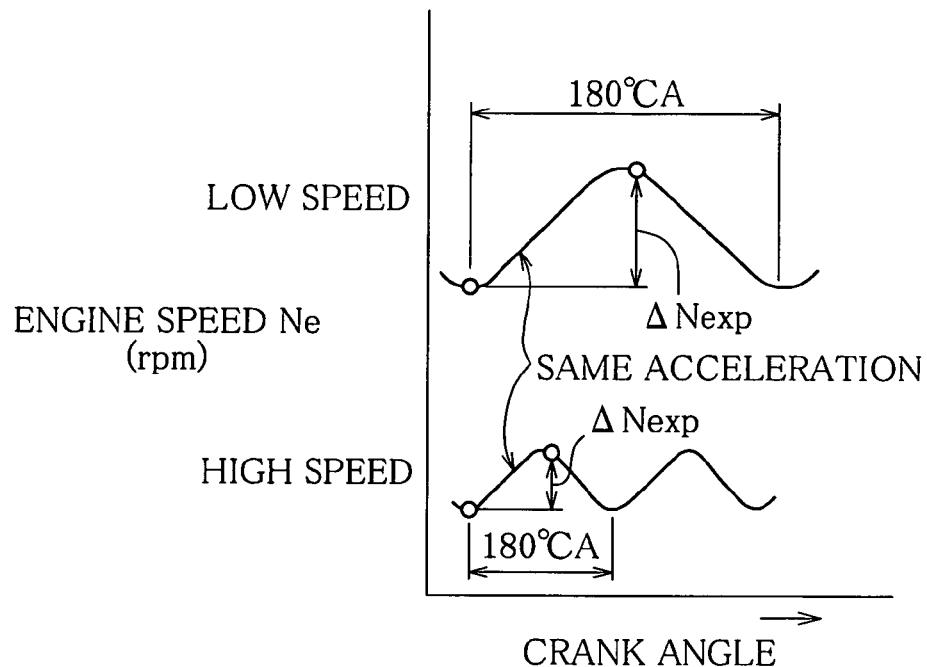
FIG. 4 illustrates how a rotation deviation is calculated with respect to different engine speeds.

This process is performed for the purpose of correcting the influence of a difference in the engine speed Ne on the rotation deviation ΔNexp. FIG. 4 illustrates how the rotation deviation ΔNexp is calculated with respect to different engine speeds Ne. As shown in the figure, even in cases where the engine speed Ne rises at an identical acceleration with identical combustion taking place in each combustion cycle, the rotation deviation ΔNexp derived with respect to a high engine speed is about ½ of that derived with respect to a low engine speed which is half the high engine speed, because of the shortness of the combustion cycle itself. The change in the rotation deviation ΔNexp is almost correlated with the engine speed Ne, though it somewhat depends upon the speed region. Accordingly, the rotation deviation ΔNexp is corrected by using 1000 rpm as a reference, to thereby cancel out the influence exerted by a difference in the engine speed Ne.

Figure 5:
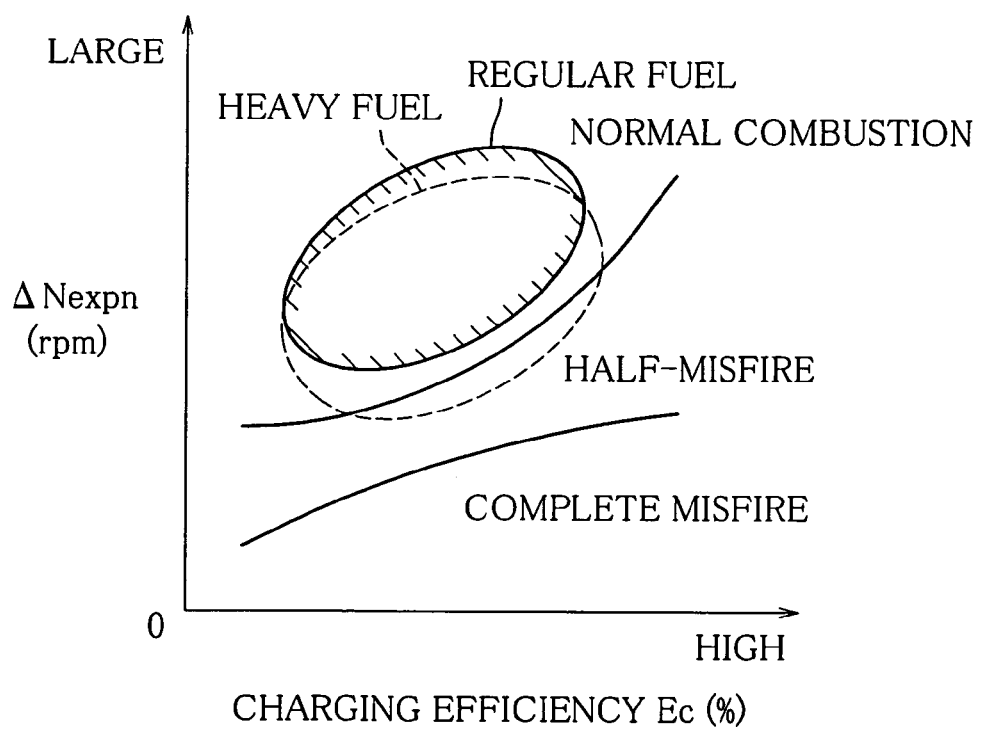
FIG. 5 shows a map for determining combustion of the engine in accordance with the normalized rotation deviation and charging efficiency.

Based on the normalized rotation deviation ΔNexpn obtained by the aforementioned process and a present charging efficiency Ec (engine load) of the engine 1, a combustion determination map shown in FIG. 5 is looked up to determine the combustion of each combustion cycle (misfire determination means). The map reflects difference in the charging efficiency Ec in order to cancel out the influence exerted on the rotation deviation ΔNexp by a difference in the charging efficiency Ec (i.e., difference in the intake air quantity), as in the case of the engine speed Ne. As seen from the illustrated map, as the normalized rotation deviation ΔNexpn lowers, the combustion of each combustion cycle is judged to deteriorate in order of normal combustion, half-misfire and complete misfire.

The following explains normal combustion, half-misfired combustion and completely misfired combustion. Normal combustion indicates combustion in which a major part of fuel supplied to the cylinder burns and contributes toward increasing the cylinder pressure, thus permitting the engine speed to rise or stable operation of the engine to be maintained, so that the exhaust gas characteristics are not deteriorated. Such combustion results in a large rotation deviation (large rotation variation amount) between the pre-combustion angular velocity and the post-combustion angular velocity within one combustion cycle. When associated with the normalized rotation deviation ΔNexpn and the charging efficiency Ec (engine load), normal combustion takes place in a normal combustion region exemplified in FIG. 5, within the engine operation region.

On the other hand, half-misfired combustion takes place in a half-misfire region exemplified in FIG. 5 and indicates combustion which can be stabilized by correcting the air-fuel ratio toward the rich side by the combustion F/B control. Half-misfired combustion takes place especially at the time of transition of the air-fuel ratio toward the lean side.

Completely misfired combustion indicates poorer combustion than half-misfired combustion, or combustion which may possibly worsen if the air-fuel ratio is corrected toward the rich side where completely misfired combustion is caused due to variation of the air-fuel ratio toward the rich side. Completely misfired combustion takes place in a complete misfire region exemplified in FIG. 5.

The map of FIG. 5 also shows a difference in combustion between regular fuel and heavy fuel. As seen from the map, heavy fuel is liable to cause half-misfire, compared with regular fuel.

The combustion in the engine 1 is determined in this manner, and if it is judged that complete misfire has occurred, the warning lamp 24 is turned on to notify the driver of the occurrence of complete misfire. On the other hand, if it is judged during execution of the catalyst W/U control that half-misfire has occurred, the ECU 21 performs the combustion F/B control to correct the air-fuel ratio of the engine 1 toward the rich side, for example. This process is carried out by increasing a combustion F/B correction factor Kconv, which is one of correction terms for correcting the valve opening time of the fuel injection valve 8, thereby increasing the fuel injection quantity. Consequently, the air-fuel ratio, which is being controlled to the lean side by the catalyst W/U control, is shifted toward the rich side by a predetermined amount to stabilize the combustion. When the combustion is judged to be normal or when it is judged that complete misfire has occurred, the combustion F/B correction factor Kconv is gradually decreased for the convergence of the air-fuel ratio.

The fuel injection quantity is not increased in case of complete misfire, unlike half-misfire, in order to cope with the case where the complete misfire has been caused by rich air-fuel mixture. Namely, complete misfire occurring during the catalyst W/U control is presumably caused because the controlled air-fuel mixture is too lean, but in some cases, complete misfire is caused when the air-fuel ratio is varied toward the rich side for some reason. If, in such a situation, the fuel injection quantity is incremented, the fuel increment is emitted without being burned, deteriorating the exhaust gas characteristics. To avoid deterioration in the exhaust gas characteristics, the fuel quantity is not increased in case of complete misfire.

Whether to increase the fuel quantity in case of complete misfire or not should preferably be determined by comparing the merit (improvement in the exhaust gas characteristics by avoidance of misfire) of increasing the fuel quantity where complete misfire has been caused by lean air-fuel mixture, and the demerit (deterioration in the exhaust gas characteristics due to unburned fuel increment) of increasing the fuel quantity where complete misfire has been caused by rich air-fuel mixture. According to circumstances, the fuel quantity may be increased also when complete misfire has occurred, as in the case of half-misfire. In this case, the same incremental correction gain as that applied at the time of half-misfire may be set for the combustion F/B correction factor Kconv. Alternatively, when complete misfire has occurred, a greater incremental correction gain than that applied at the time of half-misfire may be set. In this case, the fuel injection quantity is increased to a larger quantity at the time of complete misfire than in the case of using a common incremental correction gain, whereby the combustion in the engine 1 can be quickly and reliably stabilized.

Figure 6:
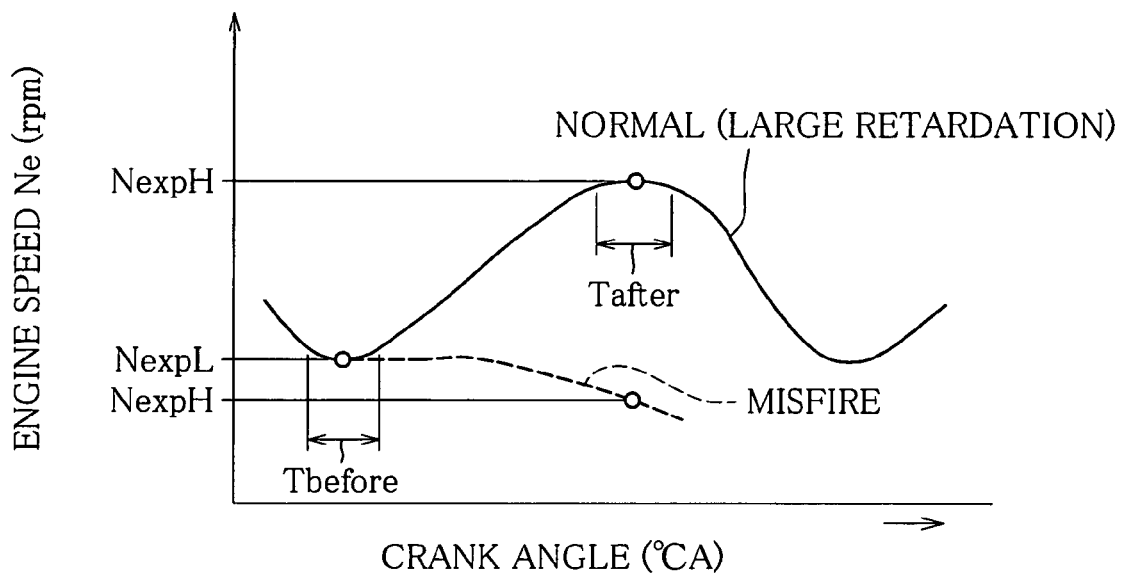
FIG. 6 exemplifies the manner of how misfire is determined when the amount of retardation is large.
Figure 7:
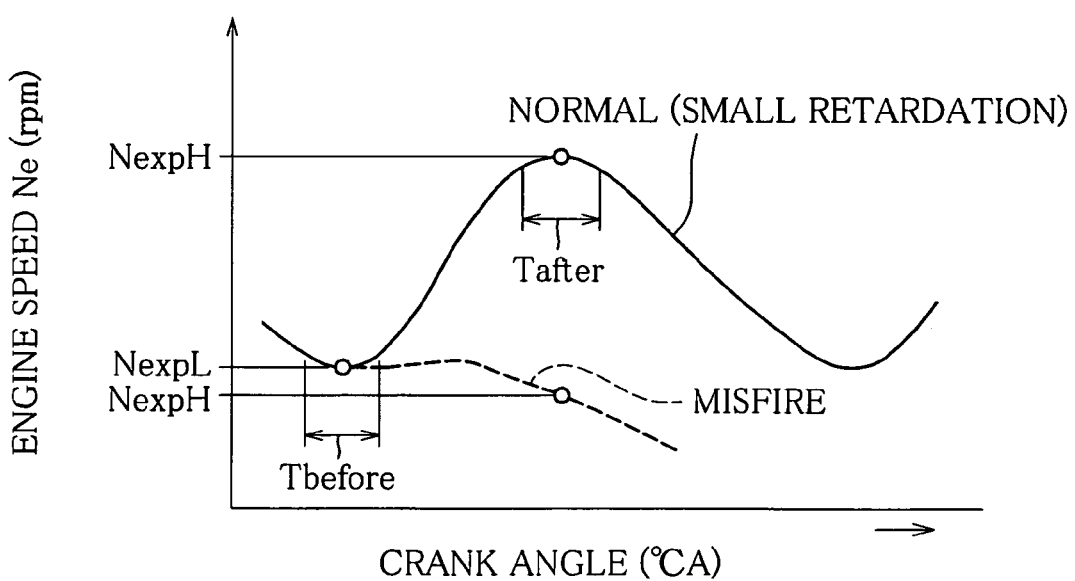
FIG. 7 exemplifies the manner of how misfire is determined when the amount of retardation is small.

FIGS. 6 and 7 each illustrate the manner of how misfire is actually determined by the ECU 21, wherein FIG. 6 shows the case where the amount of retardation by the catalyst W/U control is large and FIG. 7 shows the case where the amount of retardation by the catalyst W/U control is small. As explained above, in each combustion cycle, the rotation deviation $\Delta Nexp$ (=NexpH−NexpL) is calculated as a rotation variation amount between the pre-combustion detection time period Tbefore and the post-combustion detection time period Tafter, and the combustion in the engine 1 is determined on the basis of the normalized rotation deviation $\Delta Nexpn$ obtained from the rotation deviation $\Delta Nexp$.

Where complete misfire or half-misfire has occurred, the engine speed Ne does not rise at all or only slightly rises, as indicated by the broken lines in FIGS. 6 and 7. In such cases, therefore, the rotation deviation $\Delta Nexp$ between the pre-combustion detection time period Tbefore and the post-combustion detection time period Tafter is calculated as a negative value or, if positive, a very small value. On the other hand, when the combustion is normal, the engine speed Ne greatly rises, as indicated by the solid lines in FIGS. 6 and 7, and thus the rotation deviation $\Delta Nexp$ is calculated as a large positive value. Consequently, the rotation deviation $\Delta Nexp$ clearly reflects the state of combustion of the corresponding combustion cycle, whereby the combustion in the engine 1 can be determined based on the normalized rotation deviation $\Delta Nexpn$ obtained from the rotation deviation $\Delta Nexp$, with the use of the map shown in FIG. 5.

Thus, in this embodiment, the combustion is determined directly from the map on the basis of the normalized rotation deviation $\Delta Nexpn$ indicative of an amount of rotation variation caused during the combustion cycle, or more specifically, by comparing the normalized rotation deviation $\Delta Nexpn$ with thresholds derived from the map. Consequently, the combustion is determined without regard to the combustions of preceding combustion cycles, and thus, unlike the misfire detection device disclosed in Unexamined Japanese Patent Publication No. 2000-205035 in which misfire is determined based on the deviation of rotation variation amount between a present combustion and the combustion three ignitions before, the determination results are never influenced by, for example, the combustion three ignitions before. It is therefore possible to accurately detect misfire in individual combustion cycles without being influenced by the combustions of preceding combustion cycles.

Also, during the catalyst W/U control, the fuel injection quantity can be corrected based on accurate half-misfire determination. Accordingly, even in a situation where half-misfire is liable to occur because of the use of heavy fuel which has poor volatility, the fuel injection quantity can be adequately corrected so that the air-fuel mixture may be as lean as possible without causing misfire. It is therefore possible to accelerate activation of the catalyst 17 while at the same time avoiding deterioration in combustion due to misfire attributable to lean mixture.

Further, if complete misfire occurs during the catalyst W/U control, the incremental correction of the fuel quantity by the combustion F/B control is suspended. Thus, where the complete misfire has been caused due to rich air-fuel mixture, the incremental correction is suspended, thereby avoiding a situation where the fuel increment is discharged without being burned, which deteriorates the exhaust gas characteristics.

While the preferred embodiment has been described in the above, it is to be noted that the present invention is not limited to the foregoing embodiment. For example, in the above description of the embodiment, the invention is applied to the direct injection type in-line four-cylinder gasoline engine 1, but the type of engine is not limited to this alone, and the invention may be applied, for example, to a manifold fuel injection type engine or to an engine with different arrangement of cylinders.

Also, in the above embodiment, in addition to the misfire determination complying with the requirements of the OBD regulations, the combustion F/B control is executed in accordance with the misfire determination results, as the counter-misfire control means, to avoid deterioration in combustion during the catalyst W/U control. It is not essential, however, to execute the combustion F/B control and the control device may simply be provided with the function of turning on the warning lamp 24 when misfire has occurred.

Further, in the foregoing embodiment, the post-combustion detection time period Tafter is set in accordance with the amount of retardation of the ignition timing during the catalyst W/U control, because the crank angle at which the engine speed Ne becomes maximum during one combustion cycle of each cylinder varies depending on the ignition timing. However, the crank angle at which the engine speed Ne becomes maximum also varies due to other factors than the ignition timing, for example, due to a difference in the air-fuel ratio. The post-combustion detection time period Tafter may therefore be set in accordance with the air-fuel ratio, in place of or in addition to the amount of retardation.

Also, in the above embodiment, during each of the pre-combustion and post-combustion detection time periods Tbefore and Tafter, the rotation speed is detected three times each for an interval of 10° CA, as shown in FIG. 3. Then, the angular velocity of each detection time period is calculated by obtaining a weighted average of the rotation speeds detected in the corresponding detection time period. The number of times the rotation speed is detected is, however, not particularly limited and may be greater or smaller than three. On detection of a preset fixed crank angle position, the angular velocity may be calculated at that position. Also, a variable crank angle position, which is delayed with increase in the retardation of the ignition timing, may be set in accordance with the amount of retardation, and on detection of the variably set crank angle position, the angular velocity may be calculated at that position.

What is claimed is:

1. An engine control device for detecting misfire of an engine of a motor vehicle, comprising:
   crank angle detection means for detecting a crank angle of the engine;
   angular velocity calculation means for calculating a pre-combustion angular velocity and a post-combustion angular velocity based on the crank angle detected by the crank angle detection means, the pre-combustion angular velocity being an angular velocity at a first crank angle at which rotation speed of the engine is close to a minimum value within one combustion cycle of each cylinder of the engine, the post-combustion angular velocity being an angular velocity at a second crank angle at which the rotation speed of the engine is close to a maximum value within the one combustion cycle;
   rotation variation amount calculation means for calculating, based on the pre-combustion and post-combustion angular velocities of the one combustion cycle, an amount of rotation variation caused between the first and second crank angles;
   misfire determination means for comparing the rotation variation amount calculated by the rotation variation amount calculation means with a predetermined misfire criterion value, to determine whether or not misfire has occurred in the one combustion cycle; and
   counter-misfire control means for performing a required operation when it is judged by the misfire determination means that misfire has occurred.

2. The engine control device according to claim 1, wherein, when it is judged that misfire has occurred, the counter-misfire control means warns a driver of the vehicle that misfire has occurred.

3. The engine control device according to claim 1, wherein the engine includes a catalyst arranged in an exhaust system thereof, and catalyst temperature raising means for retarding ignition timing of the engine and decreasing a fuel-to-air ratio of an air-fuel mixture supplied to the engine and thereby making the mixture lean at start of the engine to raise temperature of the catalyst, and
   the counter-misfire control means corrects a fuel injection quantity of the engine toward an incremental side when it is judged that misfire has occurred.

4. The engine control device according to claim 3, wherein, when it is judged by the misfire determination means that half-misfire has occurred, the counter-misfire control means corrects the fuel injection quantity of the engine toward the incremental side.

5. The engine control device according to claim 3, wherein, when it is judged by the misfire determination means that complete misfire has occurred, the counter-misfire control means suspends the incremental correction of the fuel injection quantity of the engine.

6. The engine control device according to claim 3, wherein the first crank angle is a preset fixed crank angle, and the angular velocity calculation means calculates the angular velocity at the preset fixed crank angle.

7. The engine control device according to claim 3, wherein the second crank angle is a variable crank angle which is delayed in accordance with an amount of retardation of the ignition timing, and the angular velocity calculation means calculates the angular velocity at the variable crank angle.

8. The engine control device according to claim 1, wherein the first crank angle is associated with a predetermined detection time period, and the angular velocity calculation means calculates the angular velocity by obtaining a weighted average of rotation speeds detected a plurality of times during the predetermined detection time period.

9. The engine control device according to claim 1, wherein the second crank angle is associated with a predetermined detection time period, and the angular velocity calculation means calculates the angular velocity by obtaining a weighted average of rotation speeds detected a plurality of times during the predetermined detection time period.

10. The engine control device according to claim 1, wherein the rotation variation amount calculation means calculates rotation variation caused between the first and second crank angles from pre-combustion and post-combustion angular velocities found by the angular velocity calculation means, and normalizes the calculated rotation variation by means of a reference engine rotation speed.

* * * * *